(No Model.)
L. V. LUCE.
SUNSHADE FOR VEHICLES.
No. 483,933. Patented Oct. 4, 1892.
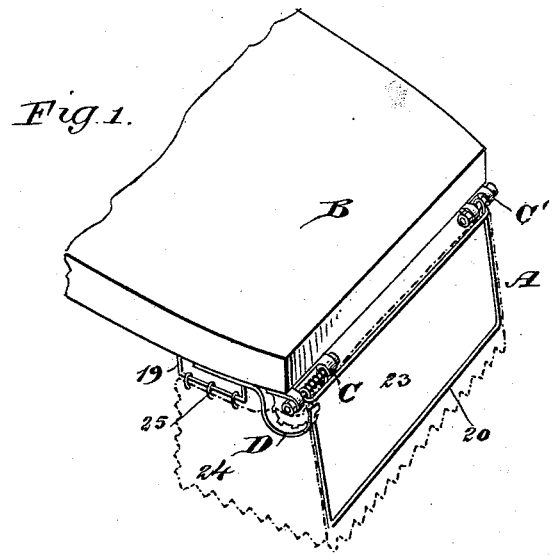
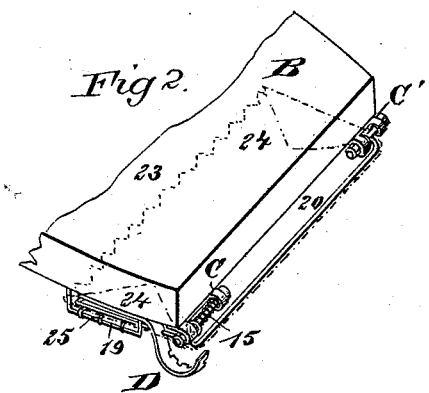
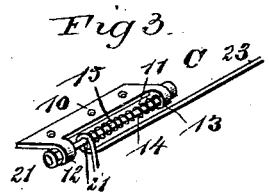
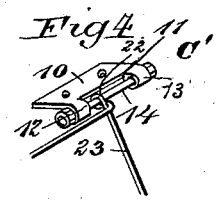
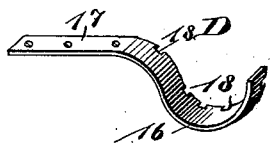
WITNESSES:
Paul Jobst
C. Sedgwick
INVENTOR
L. V. Luce
BY
ATTORNEYS.
THE NORRIS PETERS CO., PHOTO-LITHO., WASHINGTON, D. C.

UNITED STATES PATENT OFFICE.

LETITIA VICTORIA LUCE, OF NEW ORLEANS, LOUISIANA.

SUNSHADE FOR VEHICLES.

SPECIFICATION forming part of Letters Patent No. 483,933, dated October 4, 1892.

Application filed June 11, 1892. Serial No. 436,297. (No model.)

*To all whom it may concern:*

Be it known that I, LETITIA VICTORIA LUCE, of New Orleans, in the parish of Orleans and State of Louisiana, have invented a new and Improved Sunshade for Vehicles, of which the following is a full, clear, and exact description.

My invention relates to an improvement in sunshades for vehicles, and has for its object to provide a sunshade especially adapted for use with phaetons, surreys, and the like, and has for its object to provide a device which will be exceedingly light and simple and capable of adjustment expeditiously and conveniently to shade the occupants of the vehicle from the rays of the sun, and, further, to provide an adjusting mechanism whereby when the sunshade is not necessary it may be folded up parallel with the under side of the canopy or top of the vehicle and be practically concealed from view.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a perspective view of a portion of the top or canopy of a vehicle, illustrating the application of the sunshade thereto, the shade being shown as extending practically downward at a right angle from the canopy. Fig. 2 is a view similar to that shown in Fig. 1, the sunshade, however, being shown as folded up out of the way; and Figs. 3, 4, and 5 are detail views of various portions of the fixtures by means of which the sunshade is attached to and manipulated from the vehicle.

The brackets employed to maintain the sunshade A in place upon the canopy or top B of the vehicle are shown in detail in Figs. 3 and 4, and the rack by means of which the adjustment is made is illustrated in detail in Fig. 5. The brackets are designated as C and C' and the rack as D.

The brackets C and C' are practically of like construction. One of them, however, is larger than the other. Each bracket consists of a plate 10, provided with a recess 11 in its front face, affording two ears 12 and 13 at the ends of the recessed portion, and these ears are bent downward upon themselves to form bearings for a pin 14, the pin extending across the recessed portion of the plate parallel with the side wall thereof. The plates of the brackets are secured to the under side of the canopy or top—one at each side—and their ears extend beyond the front edge of the canopy, as shown in Figs. 1 and 2. The pin 14 of the larger bracket C is surrounded by a spring 15; but in the bracket C' the spring is omitted.

The rack D comprises a semicircular body 16 and a straight shank 17. The concaved surface of the body of the rack faces upward, and to its inner edge a series of notches or recesses 18 is produced. The rack is attached to the lower face of the canopy or top of the vehicle through the medium of its shank 17, and the body of the rack is located beneath and extends to the front of the bracket C, as is likewise best shown in Figs. 1 and 2, and beneath the shank 17 of the rack a staple 19 is located, it being fastened in any suitable or approved manner to the side lower edge of the canopy, and a like staple is placed upon the opposite side, the two staples being practically parallel. These staples are to act in the capacity of guides and also as supports for side curtains to be hereinafter described.

The frame of the sunshade usually consists of a stout wire 20, bent upon itself to a practically-rectangular shape, and in bending the wire eyes 21 and 22 are formed at the upper portion of its sides, the eye 21 being held to slide upon the pin of the bracket C against the tension of the spring 15, while the eye 22 has sliding movement upon the pin located in the bracket C'. The width of the frame is such that one of its sides will normally enter the notches in the rack D, being held in the notch by the tension of the spring 15. The frame is covered by a curtain 23, of any approved material, such as cloth, rubber, or fabric of any description, and the curtain is made of such length that it extends beyond the sides of the frame, and the side sections 24 of the curtain are held in position in connection with the canopy or top of the vehicle by rings 25, or the equivalents thereof, secured to the side sections of the curtain and held to travel upon the guides 19.

In operation when the shade is not needed it is carried inward and upward parallel with the inner face of the top or canopy B of the vehicle, as shown in dotted lines in Fig. 2, and in order that it may thus be carried rearward the frame is pushed in direction of the bracket C' against the tension of the spring 15 of the bracket C, whereby the frame is disengaged from the rack, and when the frame is in its upper inner position it is released and the spring 15 will act to force the frame into the inner upper notch or recess of the rack.

Any desired inclination may be given to the sunshade by carrying it either inward or outward and causing its frame to engage with any predetermined notch in the rack. When the sunshade is carried up inward, its side sections fold up with it.

This invention is exceedingly simple. It is durable and readily applied to any vehicle, and it is evident that it may be both expeditiously and conveniently manipulated.

Having thus described my invention, I claim as new and desire to secure by Letters Patent—

1. A sunshade for vehicles, the same consisting of brackets adapted for attachment to a vehicle, one of the brackets being provided with a spring, a frame held to slide in the brackets and against the tension of the above-named spring, and a rack also adapted for attachment to the vehicle and having a series of notches or recesses to receive one edge of the frame, as and for the purpose set forth.

2. A sunshade for vehicles, consisting of brackets adapted for attachment to the canopy or top, the brackets being provided with pins and one of them with a spring, a frame provided with a cover and held to travel upon the pins of the brackets and against the tension of the said spring, and a rack provided with a series of notches or recesses and located adjacent to the spring-carrying bracket, the notches being adapted to receive a side of the frame, substantially as and for the purpose set forth.

3. A sunshade for vehicles, the same consisting of brackets adapted for attachment to the top or canopy of a vehicle, the brackets being provided with pins and one of them with a spring coiled around its pin, a rack adapted for attachment to the top or canopy adjacent to the spring-carrying bracket, a covered frame having side extensions, the frame having sliding movement upon the pins of the brackets against the tension of the spring carried by one of the brackets and one edge of the frame being adapted for engagement with the rack, and guides supporting the side extensions of the frame-cover, as and for the purpose set forth.

LETITIA VICTORIA LUCE.

Witnesses:
E. EVARISTE MOÏSE,
CHAS. T. YOBARD.